United States Patent Office 2,773,370
Patented Dec. 11, 1956

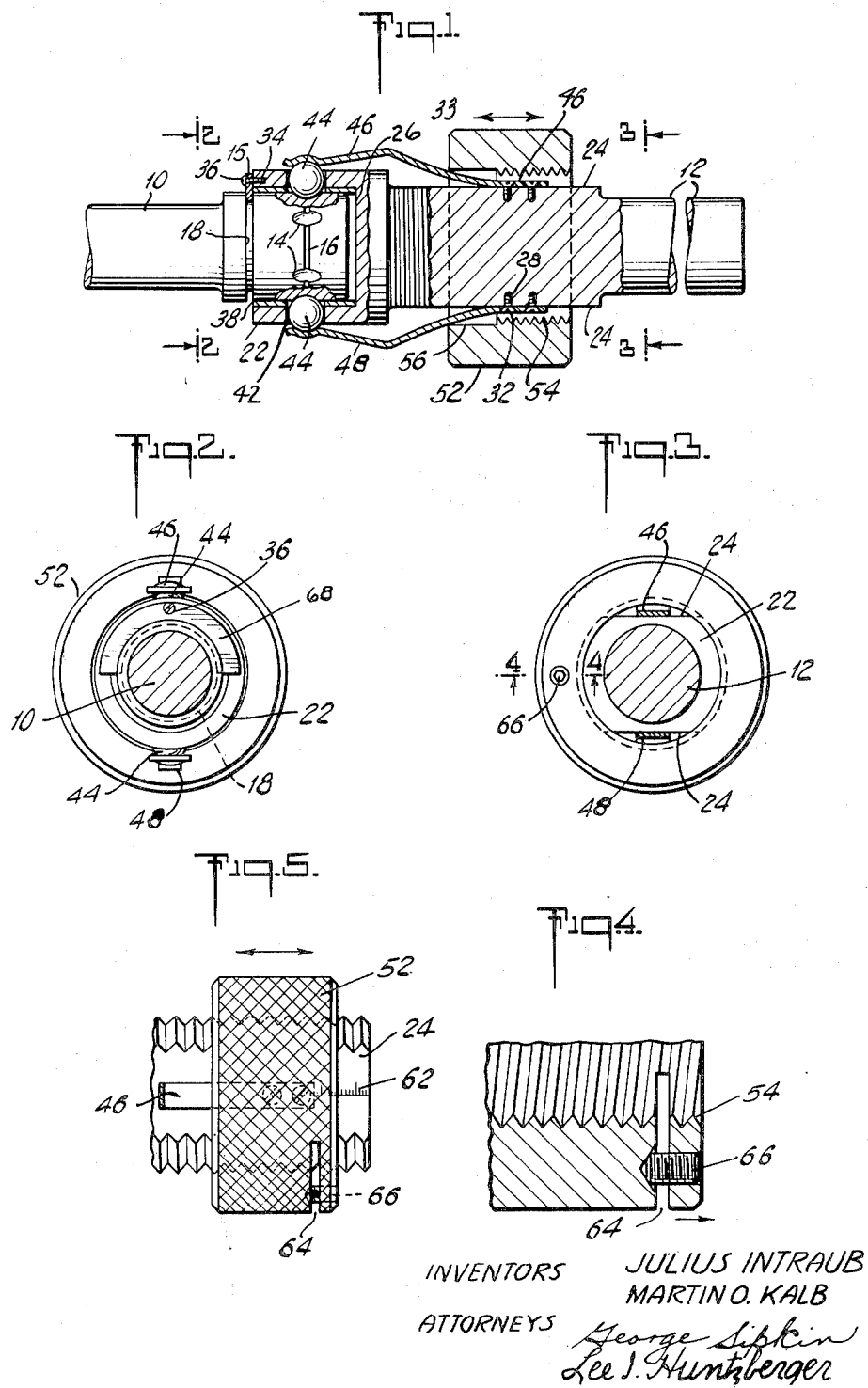

2,773,370

TORQUE LIMIT CLUTCH

Julius Intraub and Martin O. Kalb, New York, N. Y.

Application April 24, 1953, Serial No. 351,065

7 Claims. (Cl. 64—29)

(Granted under Title 35, U. S. Code (1952), sec. 266)

The invention described herein may be manufactured and used by or for the Government of the United States of America for governmental purposes without the payment of any royalties thereon or therefor.

This invention relates to improvements in torque limit clutches and more particularly to improvements in torque limit clutches of the type which are adapted to transmit up to and including a predetermined maximum torque, act as speed limiters, and be characterized by a low moment of inertia.

An object of this invention is to provide an improved torque limit clutch.

Another object is to provide a torque limit clutch which is adapted to transmit a predetermined maximum torque.

Another object is to provide an improved torque limit clutch which is readily adjustable for varying the magnitude of the maximum torque which the clutch can transmit.

Another object is to provide an improved torque limit clutch wherein the maximum torque that may be transmitted by the clutch is selectively gradually adjustable.

Another object is to provide an improved torque limit clutch adapted to also function as a speed limiting device.

Another object is to provide a torque limit clutch characterized by a minimal moment of inertia so as to be usable with sensitive instruments such as servomechanisms and to be capable of fine adjustment.

Other objects and many of the attendant advantages of this invention will be readily appreciated as the same becomes better understood by reference to the following detailed description when considered in connection with the accompanying drawings wherein:

Fig. 1 is a plan view partly in section and partly in elevation of a preferred embodiment of this invention, Fig. 2 is a cross sectional view of the invention taken along the line 2—2 of Fig. 1, Fig. 3 is a cross sectional view of the invention taken along the line 3—3 of Fig. 2, Fig. 4 is a partial sectional view taken along the plane 4—4 of Fig. 3, and Fig. 5 is a fractional view of the invention of Fig. 1 showing the calibration marks.

The preferred embodiment of this invention shown in Figs. 1–5 includes a pair of axially aligned shafts 10 and 12. The shafts 10 and 12 may be the adjacent portions of a pair of coaxial shafts of a driving means and a load adapted to be driven by the driving means, both not shown, or they may be short shafts as shown in Fig. 1 adapted to be coupled to other shafts. If both of the shafts 10, 12 are short stub shafts the torque limit clutch is a separable unit.

It is assumed for purposes of description only that the shaft 10 is the driving shaft. It is adapted to be rigidly connected to a driving motor. Shaft 10 is formed with a plurality of surface depressions 14. The depressions 14 are all formed in the same transverse plane and are equally spaced. A narrow annular groove 16, not as deep as the depressions 14, is formed in the shaft 10 in the same transverse plane as the depressions 14. A second narrow and shallow groove 18 is formed in the shaft 10 and spaced by a short distance from the groove 16.

The groove 16 serves to prevent undesired separation of the shafts 10 and 12. The groove 18 is included as supplementary to or as a substitute for the groove 16 in serving to aid in retaining the shafts 10 and 12 in assembled relationship.

The end of the shaft 12 which is adjacent the grooved end of the shaft 10 includes an axial section 22 of increased diameter. A pair of opposed flats 24 (Fig. 3) are milled or otherwise symmetrically formed on the axial section 22, for substantially ½ its length. The free end of the axial section 22 of the shaft 12 is end milled, counterbored, or the like to provide an axial cylindrical recess 26. To recapitulate the description of shaft 12 thus far set forth, the shaft may either be the end of a shaft forming part of a load, not shown, or it may be a separable short stub shaft adapted to be connected to the shaft or a driven load by any suitable coupling means, not shown. The axial section 22 of the shaft 12 is of increased diameter and is formed with a pair of opposed flats 24 and an end axial cylindrical recess 26. The flats 24 are drilled and tapped at 28 for receiving a pair of machine screws 32 at assembly.

The axial section 22 is threaded for substantially the same distance traversed by the flats 24. The end of the axial section 22, at the rim of the recess 26, is drilled and tapped at 34 for receiving a machine screw 36 at assembly.

There is press-fitted in the axial cylindrical recess 26 in the end of the axial section 22 of shaft 12 a bearing sleeve 38. The bearing sleeve 38 terminates flush with the end of the axial section 22 of the shaft 12. Opposed guiding passages 42 (Figs. 1 and 2) that preferably are axially aligned are formed in the assembled shaft 12 and bearing sleeve 38.

Driving torque is transmitted from the shaft 10 through the torque limit clutch to the shaft 12 by means of a pair of spheres 44 disposed within the guiding passages 42 and seated in the depressions 14 of the shaft 10. The spheres 44 are retained in operative engagement with the shafts 10 and 12 by means of a pair of flat springs 46 and 48. The flat springs 46 and 48 are angularly bent at one end and are formed with suitable openings to receive the machine screws 32 which are threadedly engaged within the tapped holes 28 in the axial section 22 of the shaft 12. The ends of the flat springs 46 and 48 opposite their bent ends overlay the guiding passages 42 that receive the spheres 44. In place of spheres 44, the torque limit clutch may include other suitable means for performing the same function.

The magnitude of the torque that can be transmitted by the torque limit clutch from the shaft 10 to the shaft 12 is a function of several variables which include the diameter of the spheres 44, the depth of the depressions 14 in the shaft 10, and the force exerted by the flat springs 46 and 48 upon the spheres 44 for seating them in the depressions 14. Resort is had in this invention to varying the amount of force exerted by the flat springs 46 and 48 upon the spheres 44 for varying the magnitude of the maximum torque that is transmitted by the torque limit clutch.

To vary the amount of force that the flat springs 46 and 48 exert upon the spheres 44 an adjusting nut 52 is provided for threaded engagement with the axial section 22 of the shaft 12. The outer surface of the nut 52 is preferably knurled to facilitate manual adjustment. The inside of the nut 52 is formed with a threaded section 54 which threadedly engages with the threaded portion of the axial section 22 of the shaft 12. The remainder of the adjusting nut 52 is internally formed with a portion 56 of increased diameter which is adapted to overlay and bear against part of the flat springs 46 and 48. By manually rotating the adjusting nut 52 the distortion or bowing of the flat springs 46 and 48 is either increased or decreased depending upon the direction of rotation of the nut 52 to thereby vary the magnitude of the maximum torque that is transmitted by the torque limit clutch. The clutch may be calibrated as shown at 62 in a manner similar to a micrometer. To retain the selected setting of the nut 52 a locking arrangement is provided and includes slotting the nut as at 64 (Fig. 4). Centrally of the slotted portion, the nut 52 is drilled and tapped for receiving a set screw 66. By threading the set screw 66 inwardly, the slot 64 formed in the nut is caused to widen thereby causing the threads of the nut 52 to jam against the threads on the axial section 22 of the shaft 12.

The groove 16 of the shaft 10 normally serves to prevent relative axial movement of the shafts 10 and 12 when the balls are not seated in the depressions 14. For greater insurance against separation a semicircular flat locking member is secured to the end of the axial section 22 by means of a machine screw 34. The semicircular flat locking member 68 in cooperation with the groove 18 of the shaft 10 positively prevents relative axial movement of the shafts 10 and 12. The locking member 68 does not interfere with relative rotation of the shafts 10 and 12.

Where the device is designed for use with sensitive instruments such as small servo-mechanisms a low moment of inertia is a necessary characteristic. The torque limit clutch of this invention has a low moment of inertia since it can be readily fabricated with a small outside diameter. The flat springs have a minimal effect toward increasing the low moment of inertia. In addition the nut 52 and the shaft 12 may be made of aluminum or magnesium to minimize the weight and thereby the inertia.

In operation the shaft 10 is adapted to be connected to a driving member and the shaft 12 is adapted to be connected to a driven member except where the shafts 10 and 12 are the integral end portions of the shafts of driving and driven members, respectively. After a predetermined maximum torque is decided upon for transfer from the driving member to the driven member, the adjusting nut 52 is rotated until the desired torque is indicated by the calibration marks 62 on the flat 24 of shaft 12. The set screw 66 is tightened to retain the adjusting nut 52 in the setting decided upon. So long as the torque transmitted from the driving means, not shown, to the load, not shown, does not exceed the preset maximum no rotational slippage occurs between the shaft 10 and the shaft 12. However when the torque does exceed the preset maximum the two shafts do slip relative to one another. The slippage is evidenced by an aural indication due to the snapping of the spheres 44 into and out of the depressions 14. The pitch of the aural indication is a function of the speed of rotation and the number of depressions 14 on the shaft 10.

The torque limit clutch of this invention also functions as a speed limiting device. As the speed of rotation increases the spheres 44 are displaced radially decreasing the amount of torque that can be transmitted through the torque limit clutch. The driving shaft 10 will begin to slip relative to the driven shaft 12 until the speed of the driven shaft 12 decreases sufficiently to permit the spheres 44 to seat firmly within the depressions 14. The speed limiting feature of this invention enhances its safety characteristics.

Where the magnitude of the torque transmitted through the torque limit clutch is sufficiently small to permit manually gripping the shaft 12 to hold it against rotation, the adjusting nut 52 may be reset without shutting down the associated apparatus. A skilled mechanic can perform the adjustment very quickly.

Obviously many modifications and variations of the present invention are possible in the light of the above teachings. It is therefore to be understood that within the scope of the appended claims the invention may be practiced otherwise than as specifically described.

We claim:

1. A torque limit clutch comprising a driver shaft and a driven shaft, one of said shafts being formed with an axial cylindrical recess at one end, one end of the other of said shafts nesting within the recess in said one of said shafts, the one end of said one shaft having the recess further formed with a plurality of radial passages, all of the passages being in a single transverse plane and communicating with the axial cylindrical recess, a circular series of depressions, each of predetermined configuration, formed adjacent the one end of said other shaft at such distance from the end thereof that the plane of the radial passages in said one shaft and the plane of depressions in said other shaft coincide when said other shaft is properly nested in the recess in said one shaft, a bearing sleeve between the contiguous ends of said two shafts, a plurality of torque transmitting members engaging said driver and said driven shafts, said torque transmitting members positioned in the radial passages in said one shaft and adapted to seat in the depressions in said other shaft, biasing means for said torque transmitting members, said biasing means including a plurality of flat springs equal in number to the radial passages in said one shaft and fastened at one of their ends to extend longitudinally of said one shaft so that their free ends overlay the radial passages, said flat springs being bowed when the free ends thereof abut said torque transmitting members in the corresponding radial passages for firmly seating them in the depressions in said other shaft, an adjusting means for said biasing means, said adjusting means comprising a nut adapted to vary the degree of bow in the flat springs to thereby vary the force exerted upon the torque transmitting members for seating them in the depressions in said other shaft, a locking means for said adjusting means, and a second locking means for preventing relative axial movement of said shafts.

2. A torque limit clutch comprising a driver shaft and a driven shaft, one of said shafts being formed with an axial cylindrical recess at one end, one end of the other of said shafts nesting within the recess in said one of said shafts, the one end of said one shaft formed with the recess further formed with a plurality of radial passages defining a single transverse plane and communicating with the axial cylindrical recess, a circular series of depressions, each of predetermined configuration, formed adjacent the said one end of said other shaft at such distance from the end thereof that the plane of the radial passages in said one shaft and the plane of the depressions in said other shaft coincide when said other shaft is properly nested in the recess in said one shaft, a bearing sleeve between the contiguous ends of said two shafts, a plurality of torque transmitting members engaging said driver and said driven shafts, said torque transmitting members positioned in the radial passages in said one shaft and adapted to seat in the depressions in said other shaft, biasing means for said torque transmitting members, said biasing means including a plurality of flat springs equal in number to the radial passages, said flat springs being bowed when the free ends thereof abut said torque transmitting members in the corresponding radial passages for firmly seating said torque transmitting members in the depressions in said other shaft, an adjusting means for said biasing means, said adjusting means comprising a nut adapted to vary the degree of bow in said flat springs to thereby vary the force exerted upon said torque transmitting members for seating them in the depressions in said other shaft, a locking means for said adjusting means.

3. A torque limit clutch comprising a driver shaft and a driven shaft, one of said shafts being formed with an axial cylindrical recess at one end, one end of the other of said shafts nesting within the recess in said one of said shafts, the one end of said one shaft having the recess further formed with a plurality of radial passages defining a single transverse plane and communicating with the axial cylindrical recess, a circular series of depressions, each of predetermined configuration, formed adjacent the said one end of said other shaft at such distance from the end thereof that the plane of the radial passages in said one shaft and the plane of the depressions in said other shaft coincide when said other shaft is properly nested in the recess in said one shaft, a bearing sleeve between the contiguous portions of said two shafts, a plurality of torque transmitting members engaging said driver and said driven shafts, said torque transmitting members positioned in the radial passages in said one shaft and adapted to seat in the depressions in said other shaft, biasing means for said torque transmitting members, said biasing means including a plurality of flat springs equal in number to the radial passages in said one shaft and fastened at one of their ends to extend longitudinally of said one shaft so that their free ends overlay the radial passages, said flat springs being bowed when the free ends thereof abut said torque transmitting members in the corresponding radial passages for firmly seating them in the depressions in said other shaft, an adjusting means for said biasing means, said adjusting means comprising a nut adapted to vary the degree of bow in said flat springs to thereby vary the force exerted upon said torque transmitting members for seating them in the depressions in said other shaft.

4. A torque limit clutch comprising a driver shaft and a driven shaft, one of said shafts being formed with an axial cylindrical recess at one end, one end of the other of said shafts nesting within the recess in said one of said shafts, the one end of said one shaft having the recess further formed with a plurality of radial passages defining a single transverse plane and communicating with the axial cylindrical recess, a circular series of depressions, each of predetermined configuration, formed adjacent the one end of said other shaft at such distance from the end thereof that the plane of the radial passages in said one shaft and the plane of the depressions in said other shaft coincide when said other shaft is properly nested in the recess in said one shaft, a plurality of torque transmitting members engaging said driver and said driven shafts, said torque transmitting members positioned in the radial passages in said one shaft and adapted to seat in the depressions in said other shaft, biasing means for said torque transmitting members, said biasing means including a plurality of flat springs equal in number to the radial passages in said one shaft and fastened at one of their ends to extend longitudinally of said one shaft so that their free ends overlay the radial passages, said flat springs being bowed when the free ends thereof abut said torque transmitting members for firmly seating them in the depressions in said other shaft, an adjusting means for said biasing means, said adjusting means comprising a nut adapted to vary the degree of bow in the flat springs to thereby vary the force exerted upon the torque transmitting members for seating them in the depressions in said other shaft.

5. A torque limit clutch comprising a driver shaft and a driven shaft, one of said shafts being formed with an axial cylindrical recess at one end, one end of the other of said shafts nesting within the recess in said one of said shafts, the one end of said one shaft having the recess further formed with a plurality of radial passages, all of the passages being in a single transverse plane and communicating with the axial cylindrical recess, a circular series of depressions, each of predetermined configuration, formed adjacent the one end of said other shaft at such distance from the end thereof that the plane of the radial passages in said one shaft and the plane of depressions in said other shaft coincide when said other shaft is properly nested in the recess in said one shaft, a bearing sleeve between the contiguous ends of said two shafts, a plurality of torque transmitting members engaging said driver and said driven shafts, said torque transmitting members positioned in the radial passages in said one shaft and adapted to seat in the depressions in said other shaft, and biasing means for said torque transmitting members, said biasing means including a plurality of flat springs equal in number to the radial passages in said one shaft and fastened at one of their ends to extend longitudinally of said one shaft so that their free ends overlay the radial passages, said flat springs being bowed when the free ends thereof abut said torque transmitting members in the corresponding radial passages for firmly seating them in the depressions in said other shaft.

6. A torque limit clutch comprising a driver shaft and a driven shaft, one of said shafts being formed with an axial cylindrical recess at one end, one end of the other of said shafts nesting within the recess in said one of said shafts, the one end of said one shaft having the recess further formed with a plurality of radial passages, all of the passages being in a single transverse plane and communicating with the axial cylindrical recess, a circular series of depressions, each of predetermined configuration, formed adjacent the one end of said other shaft at such distance from the end thereof that the plane of the radial passages in said one shaft and the plane of the depressions in said other shaft coincide when said other shaft is properly nested in the recess in said one shaft, a plurality of torque transmitting members engaging said driver and said driven shafts, said torque transmitting members positioned in the radial passages in said one shaft and adapted to seat in the depressions in said other shaft, biasing means for said torque transmitting members, said biasing means including a plurality of flat springs equal in number to the radial passages in said one shaft and fastened at one of their ends to extend longitudinally of said one shaft so that their free ends overlay the radial passages, said flat springs being bowed when the free ends thereof abut said torque transmitting members in the corresponding radial passages for firmly seating them in the depressions in said other shaft.

7. A torque limit clutch comprising a driver shaft and a driven shaft, cylindrical bearing means secured to one end of one of said shafts, one end of the other of said shafts nesting within said cylindrical bearing means secured to said one of said shafts, said cylindrical bearing means being formed with a plurality of transverse passages, a series of depressions formed adjacent the one end of said other shaft for registration with the passages in said bearing means when said other shaft is properly nested in said bearing means secured to said one shaft, a plurality of torque transmitting members positioned in the passages in said bearing means secured to said one shaft and adapted to seat in the depressions in said other shaft, biasing means for said torque transmitting members, said biasing means including a plurality of flat springs equal in number to the passages in said bearing means and fastened at one of their ends to extend along the surface of said one shaft so that their free ends overlay the passages in said bearing means, said flat springs being stressed when the free ends thereof abut said torque transmitting members in the corresponding passages for seating said torque transmitting members in the depressions in said other shaft.

References Cited in the file of this patent
UNITED STATES PATENTS

| | | |
|---|---|---|
| 2,065,244 | Richards | Dec. 22, 1936 |
| 2,497,893 | Linahan | Feb. 21, 1950 |
| 2,514,227 | Dodge | July 4, 1950 |